Jan. 9, 1951
C. L. HALL
2,537,930
PANEL SECURED INSTALLATION
Filed Jan. 21, 1947
2 Sheets-Sheet 1
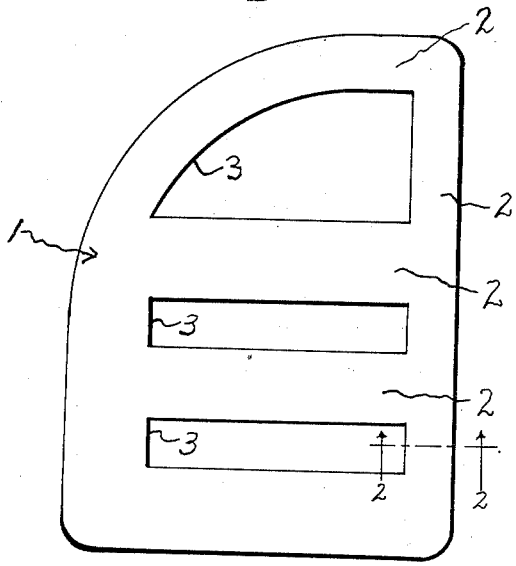
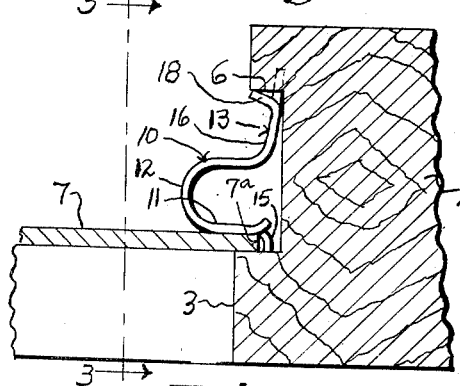
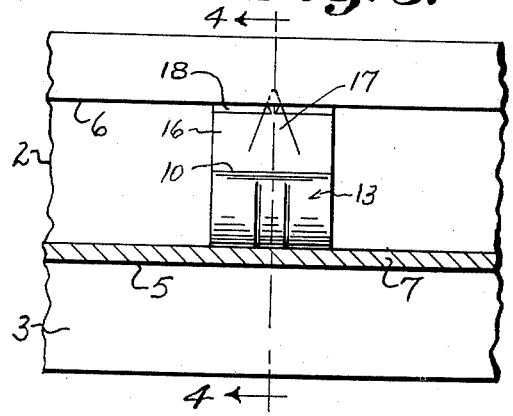
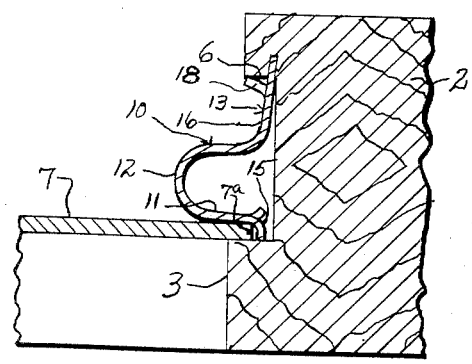
Inventor
Charles L. Hall.
By John Todd
Attorney Jan. 9, 1951 C. L. HALL 2,537,930
PANEL SECURED INSTALLATION
Filed Jan. 21, 1947 2 Sheets-Sheet 2

Inventor
Charles L. Hall.
By John Todd
Attorney

Patented Jan. 9, 1951

2,537,930

UNITED STATES PATENT OFFICE 2,537,930

PANEL SECURED INSTALLATION

Charles L. Hall, Detroit, Mich., assignor to United-Carr Fastener Corporation, Cambridge, Mass., a corporation of Massachusetts Application January 21, 1947, Serial No. 723,231

7 Claims. (Cl. 20—15)

The present invention relates to panel secured installations and to the fasteners therefor, and aims generally to improve and simplify the installations as well as the fasteners.

One of the primary objects of the invention is the provision of a panel-secured installation in which a panel of sheet material may be secured in a centrally open frame in a speedier, simpler, more economical and satisfactory manner than has heretofore been possible.

A further object of the invention is the provision of an improved and simplified fastener which may economically be manufactured and readily applied to an installation to effectively secure a panel in a centrally open frame.

The above as well as other objects of the invention will be apparent to persons skilled in the art from a consideration of the accompanying drawings and annexed specification, illustrating and describing a typical panel-secured installation as well as a preferred embodiment of fastener.

Referring to the drawings—

Fig. 1 is an outer face elevation of a typical panel-secured installation, for example a motor car body or door of the paneled type, such as a station wagon body and which preferably is constructed in accordance with the invention;

Fig. 2 is an enlarged transverse sectional view of the installation shown in Fig. 1 as taken on the line 2—2 thereof, and illustrating the fastener in side elevation;

Fig. 3 is an enlarged sectional view of the installation shown in Figs. 1 and 2 as taken on the line 3—3 of Fig. 2, and illustrating the fastener in front elevation;

Fig. 4 is an enlarged sectional view similar to Fig. 2 but illustrating the fastener members in section as taken on the line 4—4 of Fig. 3;

Figure 5:
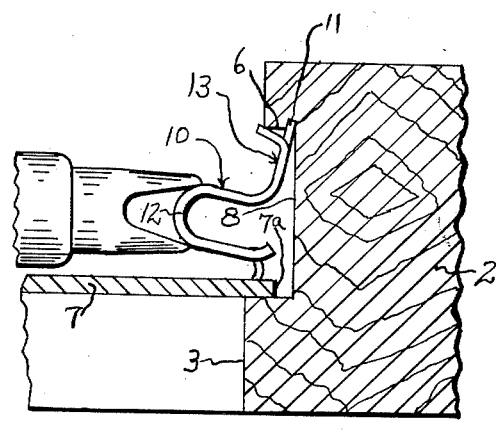
Fig. 5 is a sectional view similar to Fig. 2 and illustrating a preferred manner of applying the fasteners to the installation.
Figure 6:
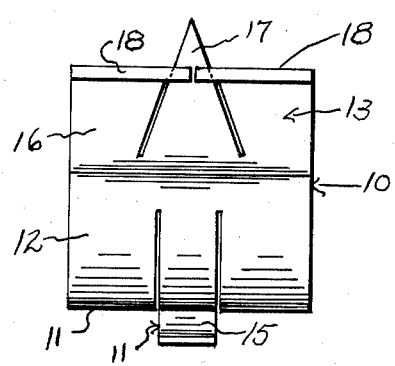
Fig. 6 is an enlarged front elevation of the fastener as viewed in Fig. 3.
Figure 7:
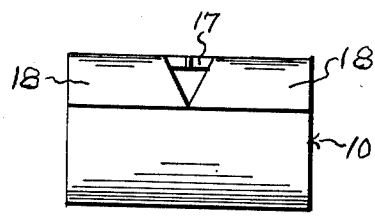
Fig. 7 is an end elevation of the fastener as viewed from the anchoring end.
Figure 8:
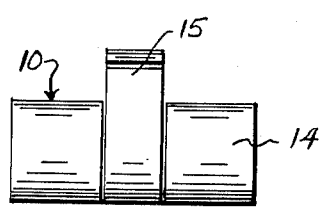
Fig. 8 is an end elevation of the fastener as viewed from the panel-engaging end.

Referring to the drawings, the installation may be one of many types embodying an open framework, in which there is a frame surrounding a panel-receiving opening, the inner marginal face of the frame being rabbeted to receive the marginal edge portion of the panel as well as the attaching means therefor. Although the invention is adaptable in all of its phases to many different installations, it is particularly useful in the construction of motor vehicle body sections in which sheet metal panels are employed in combination with an open framework of wood or the like.

As illustrated herein, the invention is embodied in a motor vehicle body section, for example a panelled door section 1 (Fig. 1) which may have a frame 2 of wood or the like provided with one or more central openings 3. The inner marginal wall 4 of the frame is preferably rabbeted beyond the opening 3 to provide a panel bearing face 5, and preferably the rabbet is of channel form to provide an anchoring ledge 6 spaced from and opposed to the face 5. A panel 7 is adapted to be positioned in the frame 2 in bearing engagement with the faces 5 to overlie the openings 3, and in the illustrated embodiment the panels may be of sheet steel and provided with a finished or coated outer face as may be desired. The panels 7 are preferably of such size that the marginal edges 7a are spaced slightly by the side faces 8 of the rabbeted channel, this being highly desirable in installations where the panel and frame are of different materials having different coefficients of expansion due to temperature changes.

The panels 7 are preferably secured in the frame by means of fastener members 10 having an anchoring portion adapted to be anchored in the anchoring ledge 6 of the rabbeted groove and panel-engaging portions adapted for tensioned engagement with the inner marginal face of the panel as well as with the outer peripheral edge 7a thereof.

According to a preferred embodiment of fastener, as illustrated in the drawings, the fastener 10 may be formed of a single piece of sheet metal, for example carbon steel, which may be heat-treated for strength and stiffness. The fastener may be of substantially ogee or of general S-shape, providing a panel-engaging portion 11, a resilient bight portion 12 and an anchoring portion 13.

The panel-engaging portion 11 of the fasteners 10 comprises a substantially flat portion 14 adapted for tensioned surface bearing engagement with the flat marginal face of the panel 7 and a terminal end panel edge engaging member 15 adapted to engage over the peripheral edge 7a of the panel 7. Preferably, the part 15 is a hook-shaped tongue extending angularly to the portion 14. It is preferably formed from a tongue slit from the central part of the portion 14 so as to be movable relatively thereto.

The anchoring portion 13 preferably comprises a part 16 of the ogee body disposed substantially perpendicular to the panel-engaging portion 14 and is provided with one or more pronged teeth 17 substantially in the plane of said perpendicular part 16. Conveniently, the tooth 16 may be cut from the central part of the anchoring portion 13 and the opposite side portions of the part 16 are bent angularly outward to provide feet 18 adapted for bearing engagement with the anchoring ledge 6 of the rabbeted groove or channel of the frame member 2.

The fasteners 10 may be readily applied to the installation in a manner illustrated in Fig. 5. With the panel initially in place in the frame 2, the fasteners are then applied in the rabbeted groove or channel by initially positioning the anchoring prongs 17 inwardly of the anchoring ledge 6. The fastener is then forced outwardly toward the periphery of the panel, as by a suitable tool T engaging the bight portion 12 until the hooked tongue 15 snaps over the peripheral edge 7a of the panel. During this operation the bight portion 12 has been placed under compression, so that when in secured position, the panel-engaging portion 4 engages the inner surface of the panel under high tension of the released bight portion 12. This tension is also exerted on the anchoring portion 13 in the plane thereof, and particularly in the plane of the pronged tooth 17 causing it to be anchored more securely in the frame 2.

Although the invention has been illustrated and described with particular reference to sheet metal panels for motor car bodies, it is to be understood that the invention is adapted to many other panel secured installations. Furthermore I do not intend to be limited to the particular form of fastener illustrated and described, as the scope of the invention is best defined in the appended claims.

I claim:

1. A fastener for securing a panel to a centrally open frame having an inwardly facing channel, said fastener comprising a sheet metal body provided with a panel-engaging means at one terminal end thereof, an anchoring means adjacent an opposite terminal end thereof, and an intermediate body portion of generally ogee shape, said panel-engaging means comprising a relatively flat end portion of said body providing a panel-bearing surface for engaging the face of a panel adjacent the edge thereof and a tongue cut from said end portion having a panel edge-engaging hook portion at its free end for engaging the edge of the panel, said anchoring means providing frame-penetrating means for engaging a face of a channel in a frame opposite the face of the channel supporting the panel, and said intermediate body portion extending generally sinuously from said panel-engaging means opposite said hook portion to said anchoring means for tensioning said anchoring means against one face of a channel and said panel-bearing surface against the face of a panel in engagement with an opposite face of the channel.

2. A fastener for securing a panel to a centrally open frame having an inwardly facing channel, said fastener comprising a sheet metal body provided with a panel-engaging means at one terminal end thereof, an anchoring means adjacent an opposite terminal end thereof, and an intermediate body portion of generally ogee shape, said panel-engaging means comprising a relatively flat end portion of said body providing a panel-bearing surface and a tongue cut from said end portion having a panel edge-engaging hook portion at its free end, said anchoring means comprising a frame-bearing portion disposed normal to said panel-bearing surface and in substantial alignment with said hook portion, a frame-bearing foot portion disposed normal to the frame-bearing portion substantially parallel to said panel-bearing surface but facing in a direction opposite thereto, and a triangular shaped tongue cut from said anchoring means extending normal to said panel-bearing surface with its base disposed in said frame-bearing portion and its apex providing a frame penetrating prong extending beyond said frame-bearing foot portion, and said intermediate body portion extending generally sinuously from the end of said panel-engaging means opposite said hook portion to said frame-bearing portion providing a resilient bight at said panel-engaging means.

3. A fastener for securing a panel to a centrally open frame having an inwardly facing channel, said fastener comprising a sheet metal body having a relatively flat end portion at one terminal end thereof providing a flat surface for bearing engagement with the face of a panel adjacent the edge thereof opposite the face of such a panel in engagement with one face of an inwardly facing channel in a centrally open frame, an anchoring means adjacent an opposite terminal end of said body for engaging an opposite face of such a channel, and an intermediate body portion of a generally ogee shape extending sinuously from adjacent one end of said flat end portion to said anchoring means for tensioning said anchoring means against one face of such a channel and said flat surface against a face of such a panel, said anchoring means having a frame-bearing portion disposed normal to said flat surface, a frame-bearing foot portion disposed normal to said frame-bearing portion providing a bearing surface substantially parallel to said flat surface facing in a direction opposite thereto, and a prong portion cut from said anchoring means extending normal said flat surface with a base disposed in said frame-bearing portion and an apex disposed beyond said frame-bearing foot portion.

4. A fastener for securing a panel to a centrally open frame having an inwardly facing channel, said fastener comprising a sheet metal body provided with a relatively flat end portion at one terminal end thereof providing a flat surface for bearing engagement with the surface of a panel adjacent the edge thereof opposite the surface thereof in engagement with one face of an inwardly facing channel in a centrally open frame, a hook portion at said terminal end for engaging the edge of such a panel, an anchoring means adjacent an opposite terminal end of said body for engaging an opposite face of such a channel, and an intermediate body portion of generally ogee shape extending sinuously from adjacent one end of said flat end portion opposite said hook to said anchoring means for tensioning said anchoring means against one face of such a channel and said flat surface against such a panel, said anchoring means having a frame-bearing portion disposed normal to said flat surface in superposed relation to said hook, a frame-bearing foot portion disposed normal to said frame-bearing portion providing a bearing surface substantially parallel to said flat surface facing in a direction opposite thereto, and a prong portion cut from said anchoring means extending normal said flat surface with a base disposed in said frame-bearing portion and an apex extending beyond said frame-bearing foot portion.

5. A panel-secured installation comprising a centrally open supporting frame having an inwardly facing rabbeted marginal wall adjacent to and surrounding the opening, a panel positioned within said frame and having a portion of one face adjacent the marginal edges thereof in bearing engagement with a face of said rabbeted wall, and a plurality of resilient fasteners for securing said panel in said frame, each of said fasteners comprising a sheet metal body provided with a panel-engaging means at one terminal end thereof, an anchoring means adjacent an opposite terminal end thereof, and an intermediate body portion of generally ogee shape, said panel-engaging means comprising a relatively flat end portion of said body having a surface in bearing engagement with the face of said panel adjacent an edge thereof, and a tongue cut from said end portion having at its free end a hook portion in engagement with the peripheral edge of said panel, said anchoring means comprising a frame-bearing portion disposed normal to said panel-bearing surface in bearing engagement with a face of said rabbeted wall, a frame-bearing foot portion disposed normal to said frame-bearing portion in tensioned engagement with a face of said rabbeted wall opposite the face engaged by a face of said panel, and a substantially triangular shaped tongue cut from said anchoring means extending normal to said panel-bearing surface with its base disposed in said frame-bearing portion and its apex providing a frame-penetrating prong extending beyond said frame-bearing foot portion and penetrating said frame, and said intermediate body portion extending generally sinuously from the end of said panel-engaging means opposite said hook portion to said frame-bearing portion.

6. A panel-secured installation comprising a centrally open supporting frame having an inwardly facing channel adjacent to and surrounding the opening, a panel positioned within said frame and having a portion of one face adjacent the marginal edges thereof in bearing engagement with a face of said channel, and a plurality of resilient fasteners for securing said panel in said frame, each of said fasteners comprising a sheet metal body provided with a relatively flat surface at one terminal end thereof in bearing engagement with an opposite face of said panel adjacent the marginal edge thereof, an anchoring means adjacent an opposite terminal end of said body in engagement with an opposite face and the base of said channel, and an intermediate body portion of a generally ogee shape extending sinuously from adjacent one end of said flat surface to said anchoring means, said anchoring means having a frame-bearing portion in engagement with said base of said channel and disposed normal to said flat surface, a frame-bearing foot portion disposed normal said frame-bearing portion in tensioned bearing engagement with the face of said channel opposite the face adjacent said flat surface, and a prong portion cut from said body extending normal to said flat surface with a base disposed in said frame-bearing portion, and an apex disposed beyond said frame-bearing foot portion penetrating said frame.

7. A panel-secured installation comprising a a centrally open supporting frame having an inwardly facing channel adjacent to and surrounding the opening, a panel positioned within said frame and having a portion of one face adjacent the marginal edges thereof in bearing engagement with a face of said channel, and a plurality of resilient fasteners for securing said panel in said frame, each of said fasteners comprising a sheet metal body provided with a relatively flat surface at one terminal end thereof in bearing engagement with an opposite face of said panel adjacent the marginal edge thereof, an anchoring means adjacent an opposite terminal end of said body in engagement with an opposite face and the base of said channel, and an intermediate body portion of a generally ogee shape extending sinuously from adjacent one end of said flat surface to said anchoring means, said body at said one terminal end having a tongue extending from said intermediate body portion having a hook portion at its free end in engagement with the edge of said panel.

CHARLES L. HALL.

REFERENCES CITED

The following references are of record in the file of this patent:

UNITED STATES PATENTS

| Number | Name | Date |
| --- | --- | --- |
| 589,600 | Hendricks | Sept. 7, 1897 |
| 1,040,572 | Otterson | Oct. 8, 1912 |
| 2,119,685 | Peremi et al. | June 7, 1938 |